United States Patent [19]
Tajima et al.

[11] Patent Number: 5,828,199
[45] Date of Patent: Oct. 27, 1998

[54] VARIABLE SPEED CONTROLLER FOR AN INDUCTION MOTOR

[75] Inventors: Hirokazu Tajima; Hidetoshi Umida, both of Tokyo; Hiroshi Tetsutani, Hyogo, all of Japan

[73] Assignee: Fuji Electric Co., Ltd., Kawasaki-ku, Japan

[21] Appl. No.: 908,575

[22] Filed: Aug. 8, 1997

[30] Foreign Application Priority Data

Aug. 8, 1996 [JP] Japan ................................. 8-209982

[51] Int. Cl.$^6$ ........................... H02P 7/622; H02P 21/00
[52] U.S. Cl. ........................ 318/779; 318/812; 318/813
[58] Field of Search ................... 318/767, 778, 318/779, 807–813

[56] References Cited

U.S. PATENT DOCUMENTS

| | | |
|---|---|---|
| 4,023,083 | 5/1977 | Plunkett . |
| 5,448,150 | 9/1995 | Yamamoto et al. . |
| 5,532,570 | 7/1996 | Tajima et al. . |
| 5,734,251 | 3/1998 | Tajima et al. ........................ 318/809 |

FOREIGN PATENT DOCUMENTS

| | | |
|---|---|---|
| 64-8896 | 1/1989 | Japan . |
| 1-198292 | 8/1989 | Japan . |
| 7-264900 | 10/1995 | Japan . |

*Primary Examiner*—Bentsu Ro
*Attorney, Agent, or Firm*—Baker & Botts, L.L.P.

[57] ABSTRACT

A variable speed controller for an induction motor that estimates the primary angular frequency and the speed without causing any error in the drive region where the induced voltage is low. The primary angular frequency and speed estimating device includes: a changeover signal generator that generates a changeover signal indicative of a first mode of operation when the induced voltage is greater than the changeover threshold, and a second mode of operation when the induced voltage is less than the changeover threshold; a differentiator, filter, etc., for estimating the load torque; a sample holder that holds the estimated load torque in the second mode of operation; an adder that generates the acceleration and deceleration torque; an integrator that integrates the acceleration and deceleration torque with the mechanical time constant of the induction motor to obtain the second generated speed; an adder that generates a second primary angular frequency; and an output device that in the first mode of operation outputs the first generated primary angular frequency as the reference primary angular frequency and the first generated speed as the estimated speed, and in the second mode of operation outputs the second generated primary angular frequency as the reference primary angular frequency and the second generated speed as the estimated speed.

6 Claims, 15 Drawing Sheets

VARIABLE SPEED CONTROLLER FOR AN INDUCTION MOTOR

BACKGROUND OF INVENTION

The present invention relates to a variable speed controller for an induction motor that facilitates executing trans-vector control of an induction motor without using any speed detector for detecting the speed of the induction motor.

The systems which have realized the so-called speed-sensor-less trans-vector control are disclosed in the Japanese Laid Open Patent Applications (Koukai) No. S64-8896 and H01-198292.

FIG. 17 is a block diagram of the conventional variable speed controller of an induction motor. In FIG. 17, magnetic flux regulator 101 outputs a reference M-axis current value $i_M{}^*$ of an induction motor IM based on a reference value of the secondary magnetic flux $\phi_2{}^*$ inputted thereto. Speed regulator 102 outputs a reference T-axis current value $i_T{}^*$ of the induction motor IM based on a reference speed value $\omega_r{}^*$ and an estimated speed value $\omega_r\#$ inputted thereto.

Note, the reference M-axis current value $i_M{}^*$ is a component of the reference current value of the induction motor parallel to the axis of magnetic flux (reference magnetizing current value), and the reference T-axis current value $i_T{}^*$ is a component of the reference current value of the induction motor perpendicular to the axis of magnetic flux (reference torque current value).

Referring again to FIG. 17, current regulator 103 outputs a reference M-axis voltage value $v_M{}^*$ and reference T-axis voltage value $v_T{}^*$ based on the reference M-axis current value $i_M{}^*$, reference T-axis current value $i_T{}^*$, actual M-axis current value $i_M$ and actual T-axis current value $i_T$ inputted thereto. A first coordinate transformer 104 executes coordinate transformation based on the reference M-axis voltage value $v_M{}^*$, reference T-axis voltage value $v_T{}^*$ and reference phase angle $\theta^*$, and outputs a reference primary voltage value $v_I{}^*$.

Electric power converter 105 supplies a three-phase alternating voltage, having certain magnitude, frequency and phase characteristics corresponding to the reference primary voltage value $v_I{}^*$ to the induction motor IM.

Current detector 106 detects the primary current of the induction motor IM. A second coordinate transformer 107 transforms the coordinate of the primary current of the two-phases of the induction motor IM based on the reference phase angle $\theta^*$ and outputs the actual M-axis current value $i_M$ and actual T-axis current value $i_T$.

Voltage detector 108 detects the primary voltage $v_I$ of the induction motor IM. A third coordinate transformer 109 executes coordinate transformation based on a primary voltage value $v_I$ and the reference phase angle $\theta^*$ inputted thereto and outputs an actual M-axis voltage value $v_M$ and actual T-axis voltage value $v_T$.

Induced voltage generating device 110 generates an induced M-axis voltage $e_M$ and induced T-axis voltage $e_T$ based on the actual M-axis current value $i_M$, actual T-axis current value $i_T$, actual M-axis voltage value $v_M$, actual T-axis voltage value $v_T$ and reference primary angular frequency $\omega_I{}^*$.

Primary angular frequency and speed estimating device 200 (hereinafter "estimating device") generates the reference primary angular frequency $\omega_I{}^*$ and estimated speed $\omega_r\#$ based on the induced M-axis voltage $e_M$, induced T-axis voltage $e_T$, reference secondary magnetic flux $\phi_2{}^*$, reference T-axis current value $i_T{}^*$ and actual T-axis current value $i_T$. Integrator 111 integrates the reference primary angular frequency $\omega_I{}^*$ and outputs the reference phase angle $\theta^*$.

FIG. 18 is a block diagram of the foregoing prior art estimating device 200. In FIG. 18, estimating device 200 includes primary angular frequency generating device 210, slip frequency generating device 221 and adder 222. The primary angular frequency generating device 210 includes regulator 211, absolute value generating device 212, divider 213, adder 214, multiplier 215 and polarity judging device 216.

The following explains the functioning of the primary angular frequency generating device 210.

First, as shown in FIG. 18, absolute value generating device 212 generates the absolute value $|e_T|$ of the induced T-axis voltage $e_T$. Divider 213 outputs the absolute value $|\omega_I{}^*|$ of the primary angular frequency $\omega_I{}^*$ by dividing the inputted absolute value $|e_T|$ of the induced T-axis voltage $e_T$ by the reference secondary flux $\phi_2{}^*$.

FIG. 19 is a vector diagram of the induced voltage of the induction motor. In FIG. 19, the induced M-axis voltage $e_M$ takes a non-zero value when an error exists between the reference phase angle $\theta^*$ generated in integrator 111 and the actual phase angle $\theta$ of induction motor IM. To make the actual phase angle $\theta$ coincide with the reference phase angle $\theta^*$, the induced M-axis voltage $e_M$ is always regulated to be zero by inputting the induced M-axis voltage $e_M$ into regulator 211 and by subtracting the output of regulator 211 from the output of divider 213 (absolute value $|\omega_I{}^*|$ of the primary angular frequency $\omega_I{}^*$) in adder 214 as described in FIG. 18.

As shown in FIG. 18, regulator 211 executes a proportional or proportional plus integral operation on the induced M-axis voltage $e_M$. By regulating $e_M$ to be zero via regulator 211, the absolute value $|\omega_I{}^*|$ of the reference primary angular frequency $\omega_I{}^*$ is corrected so that the reference phase angle $\theta^*$ coincides with the actual phase angle $\theta$. The generation of the reference primary angular frequency $\omega_I{}^*$ is then completed by detecting the sign of the induced T-axis voltage $e_T$ by polarity judging device 216 and by providing the foregoing absolute value $|\omega_I{}^*|$ of the reference primary phase angle $\omega_I{}^*$ with the detected sign in multiplier 215. The generation of the reference primary angular frequency $\omega_I{}^*$ is expressed by equation (1), where $G_{em}$ is a transfer function of regulator 211:

$$\omega_I{}^* = sgn\ (e_T)[(|e_T|/\phi_2) - G_{em}e_M] \quad (1)$$

Again referring to FIG. 18, the estimated speed $\omega_r\#$ is obtained by subtracting the reference slip frequency $\omega_s{}^*$ inputted from slip frequency generating device 221, from the reference primary angular frequency $\omega_I{}^*$ in adder 222. This operation is described by equations (2) and (3), where $R_2$ is a secondary resistance of the induction motor IM:

$$\omega_r\# = \omega_I{}^* - \omega_s{}^* \quad (2)$$

$$\omega_s{}^* = (R_2/\phi_2{}^*)i_T{}^* \text{ or } \omega_s{}^* = (R_2/\phi_2{}^*)i_T \quad (3)$$

Referring to FIG. 17, the generated reference primary angular frequency $\omega_I{}^*$ is converted to the reference phase angle $\theta^*$ by integrator 111 and used in the rotating operation (coordinate transformation) of the voltage and current in the transvector control. The estimated speed ($\omega_r\#$ is then inputted to speed regulator 102 and used for controlling the speed of induction motor IM.

A severe limitation of the conventional technique described above is the computational error in the primary angular frequency resulting from the division of the inputted absolute value $|e_T|$ of the induced T-axis voltage $e_T$ by the reference secondary flux $\phi_2$. In FIG. 17, for example, the significant digits of the detected data, i.e., the primary voltage $v_I$ of the induction motor IM, decrease with the lowering of the signal-to-noise ("S/N") ratio of the detected primary voltage signal $v_I$. Such is the case in the drive region of the induction motor IM, where the induced T-axis voltage $e_T$ and the primary angular frequency $\omega_I$ are small. Consequently, a large computational error is produced in the reference primary angular frequency $\omega_I{}^*$ due to the division of the absolute value $|e_T|$ of the induced T-axis voltage $e_T$ by the reference secondary flux $\phi_2$ in divider 213 of FIG. 18.

Accordingly, it is an object of the present invention to provide a variable speed controller for precisely controlling an induction motor characterized by a small error in the reference primary angular frequency and the estimated speed even in the drive region where the primary angular frequency, i.e., the induced voltage, is small.

It is another object of the present invention to provide a variable speed controller for controlling an induction motor by adding a load torque generating means and a speed generating means to the conventional estimating device.

SUMMARY OF THE INVENTION

According to an aspect of the invention, there is provided a variable speed controller for an induction motor, said variable speed controller resolving a primary current of said induction motor into a magnetizing current and a torque current, said primary current provided by an electric power converter generating outputs at variable voltages, frequencies and phases, said magnetizing current being a component providing a magnetic field parallel to a magnetic flux axis of said induction motor, said torque current being a component in quadrature phase to said magnetizing current, and said variable speed controller regulating said magnetizing current and said torque current independently to control an induction motor torque, said variable speed controller comprising a magnetic flux phase device for integrating a reference primary angular frequency and for obtaining a signal representing the position of said magnetic flux axis; an induced voltage generating device for generating a signal representing the induced voltage of said induction motor; a first primary angular frequency generating device for generating a first primary angular frequency signal based on said induced voltage and a magnetic flux value; a slip frequency generating device for generating a signal representing a reference slip frequency based on a reference torque current value, or an actual torque current value, and a reference magnetic flux value; a first speed generating device for subtracting said signal representing said reference slip frequency from said signal representing said first primary angular frequency, and for obtaining a signal representing a first speed value; a changeover signal generator responsive to a signal representing a sensed operating condition of said motor for generating a changeover signal, said changeover signal representing a first mode of operation and a second mode of operation for said variable speed controller, said first and second modes of operation determined by a predetermined changeover threshold of said sensed operating condition signal; a load torque generating device for generating a signal representing an estimated load torque based on said reference torque current value, said signal representing said first speed value, and said magnetic flux value; a sample holder for holding said signal representing said estimated load torque in said second mode of operation; an acceleration and deceleration torque generating device for subtracting said signal representing said estimated load torque from the product of said reference torque current value and said magnetic flux value, said acceleration and deceleration torque device generating a signal representing an acceleration and deceleration torque value; an integrator for integrating said signal representing said acceleration and deceleration torque value with an induction motor mechanical constant to obtain a signal representing a second speed value; an adder for adding said signal representing said second speed value and said signal representing said reference slip frequency, to obtain a signal representing a second primary angular frequency; and an output device for selecting and outputting, in response to said changeover signal indicating said first mode of operation, said signal representing said first primary angular frequency as said reference primary angular frequency, and said signal representing said first speed as an estimated speed, and for selecting and outputting, in response to said changeover signal indicating said second mode of operation, said signal representing said second primary angular frequency as said reference primary angular frequency and said signal representing said second speed as said estimated speed.

According to another aspect of the invention, the changeover signal generator is responsive to said signal representing said induced voltage of said induction motor being greater than said predetermined changeover threshold to indicate said first mode of operation, said signal representing said induced voltage of said induction motor being less than or equal to said predetermined changeover threshold to indicate said second mode of operation.

Advantageously, the predetermined changeover threshold for changing over from said first mode of operation to said second mode of operation is less than the predetermined changeover threshold for changing over from said second mode of operation to said first mode of operation.

According to another aspect of the invention, the changeover signal generator is responsive to said signal representing said first generated primary angular frequency being greater than said predetermined changeover threshold to indicate said first mode of operation, and responsive to said signal representing said first generated primary angular frequency being less than or equal to said predetermined changeover threshold to indicate said second mode of operation.

According to still another aspect of the invention, the changeover signal generator is responsive to said signal representing said induced voltage of said induction motor divided by said magnetic flux value being greater than said predetermined changeover threshold to indicate said first mode of operation, and responsive said signal representing said induced voltage of said induction motor divided by said magnetic flux value being less than or equal to said predetermined changeover threshold to indicate said second mode of operation.

Advantageously, the integrator for integrating said signal representing said acceleration and deceleration torque value has an initial value equal to said signal representing said first generated speed at the instance of the changeover from said first mode of operation to said second mode of operation.

DETAILED DESCRIPTION OF THE INVENTION

Figure 1:
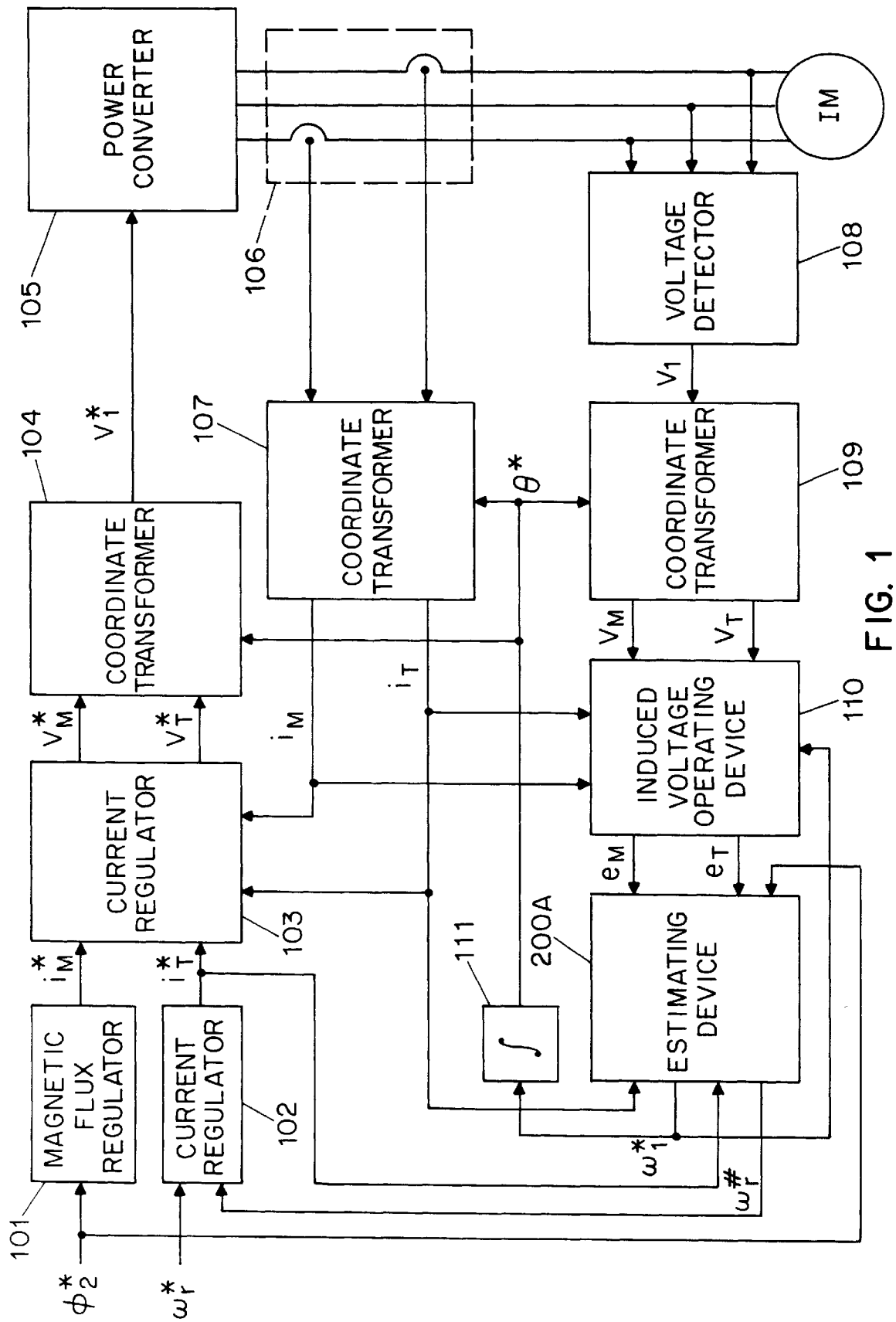
FIG. 1 is a block diagram of a variable speed controller for an induction motor according to the present invention.

FIG. 1 is a block diagram of a variable speed controller for an induction motor according to the present invention. The variable speed controller of the invention functions as follows.

The load torque $T_L$ of the induction motor is expressed by equation (4), where p is a differential operator and $T_M$ a mechanical time constant of the induction motor IM corresponding to the moment of inertia:

$$T_L = (i_T^* \phi_2^* - pT_M \omega_r) \qquad (4)$$

Based on the equation (4), the generated load torque $T_L\#$ is obtained by equation (5) in the load torque generating device using the estimated speed $\omega_r\#$ and a low-pass filter with a time constant $T_F$:

$$T_L\# = [1/(1+pT_F)](i_T^* \phi_2^* - pT_M \omega_r\#) \qquad (5)$$

Since the induction motor generates the torque expressed by $i_T^* \phi_2^*$, the acceleration and deceleration torque of the induction motor $T_{acc}$ is obtained by subtracting the generated load torque $T_L\#$ from the generated torque $i_T^* \phi_2^*$ as expressed by equation (6):

$$T_{acc} = i_T^* \phi_2^* - T_L\# \qquad (6)$$

The rotating speed of the induction motor is obtained by integrating the acceleration and deceleration torque $T_{acc}$ with a mechanical time constant of the induction motor $T_M$, the second generated speed $\omega_{rm}\#$ may be estimated by equation (7):

$$\omega_{rm}\# = (1/T_M) \int T_{acc} dt = (1/T_M) \int (i_T^* \phi_2^* - T_L\#) dt \qquad (7)$$

Therefore, in the drive region where the primary angular frequency $\omega_1$ and the induced T-axis voltage $e_T$ values are large, the first generated primary angular frequency is obtained from equation (1) as the reference primary angular frequency $\omega_1^*$ using the induced T-axis voltage $e_T$. In the drive region where the primary angular frequency $\omega_1$ and the induced T-axis voltage $e_T$ are small, the second generated primary angular frequency is obtained from equation (7) as the reference primary angular frequency using the rotating speed $\omega_{rm}\#$ of the induction motor. By using the second generated primary angular frequency as the reference primary angular frequency, the controllability is improved in the drive region where the induced T-axis voltage $e_T$ is small.

Figure 17:
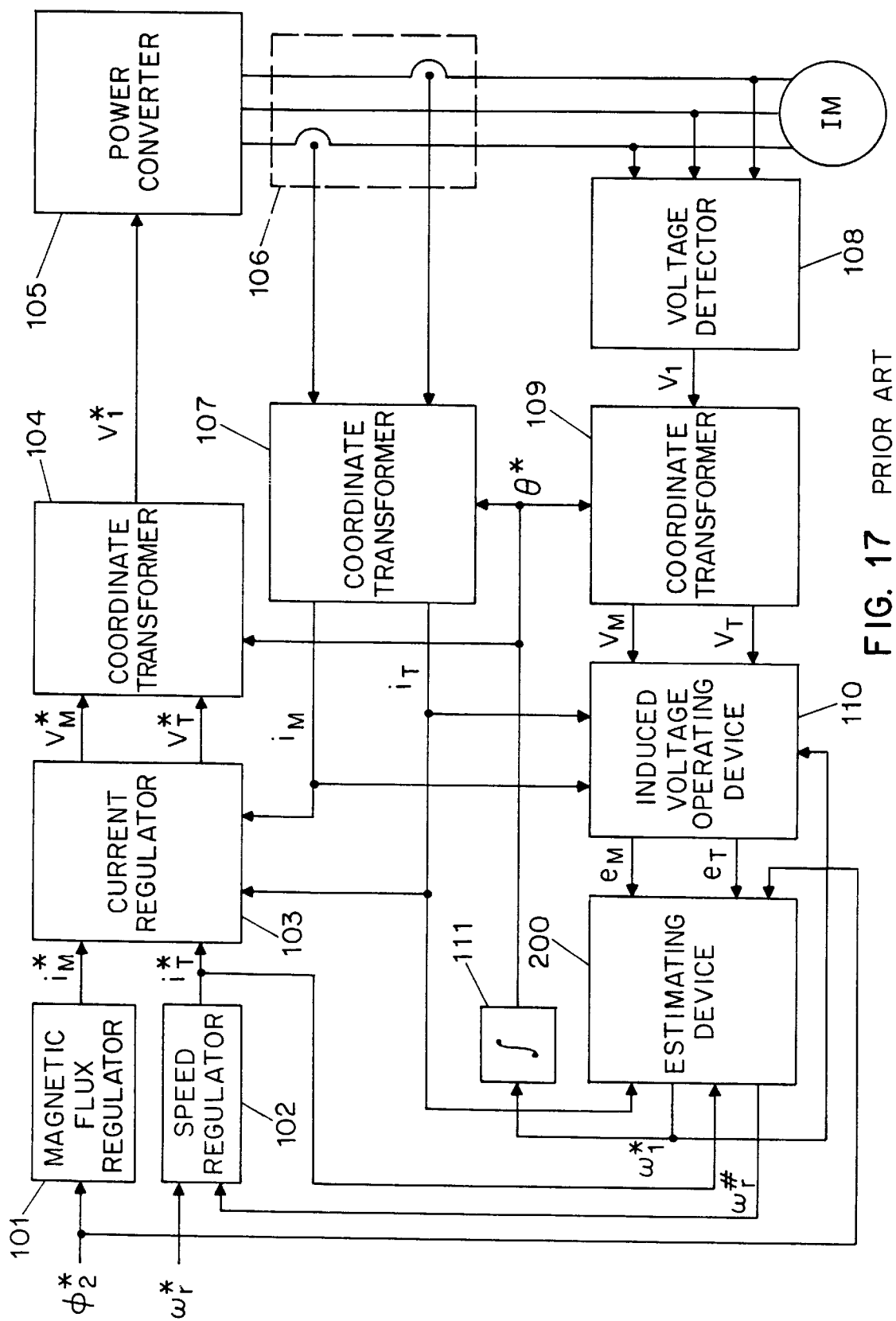
FIG. 17 is a block diagram of the conventional variable speed controller of an induction motor.

Referring again to FIG. 1, with the exception of the primary angular frequency and speed estimating device (hereinafter "estimating device") 200A, the constituent devices of present invention are the same as the devices of FIG. 17. Therefore, the following section will focus on the estimating device and variations thereof.

Figure 2:
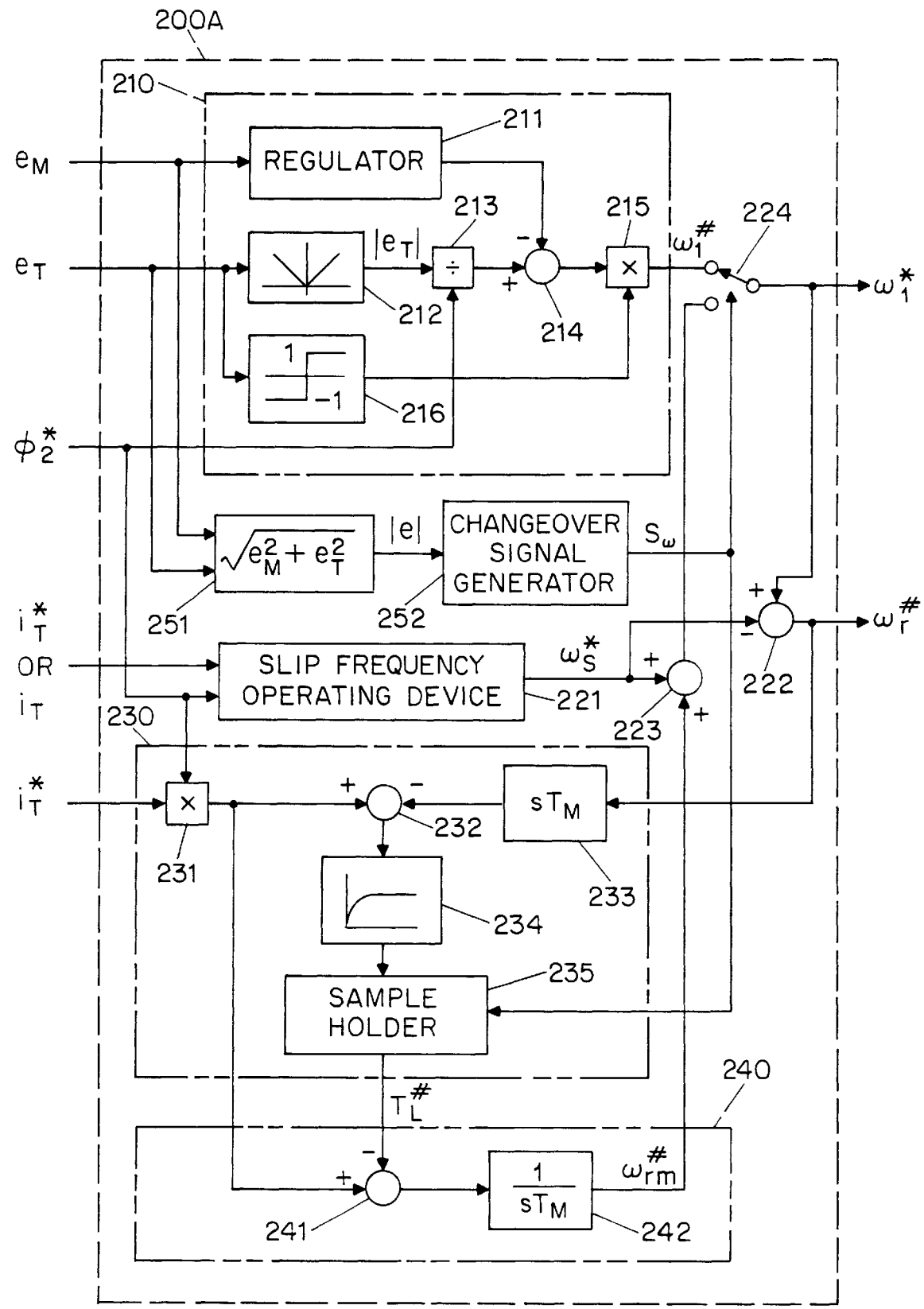
FIG. 2 is a block diagram of a first embodiment of an estimating device of the variable speed controller according to the present invention.

FIG. 2 is a block diagram of a first embodiment of an estimating device of the variable speed controller according to the present invention. Referring to FIG. 2, the estimating device 200A includes a primary angular frequency generating device 210, a slip frequency generating device 221, a load torque generating device 230, a speed generating device 240, a first adder 222, a second adder 223, a changeover switch 224, an induced voltage generating device 251, and a changeover signal generator 252. The structure of primary angular frequency generating device 210 in FIG. 2 is the same as the structure of primary angular frequency generating device 210 of FIG. 18.

The induced voltage generating device 251 generates the magnitude of the induced voltage |e| based on the induced M-axis voltage $e_M$ and induced T-axis voltage $e_r$. The changeover signal generator 252 outputs a changeover signal $S_\omega$ in response to the input signal |e| to the changeover switch 224. The changeover signal $S_\omega$ indicates a second mode of operation when the input signal |e| is equal to or less than a predetermined changeover threshold $\omega_{L1}$, i.e., when the primary angular frequency and the induced voltage are low. The changeover signal $S\omega$ indicates a first mode of operation to when the input signal |e| is greater than the predetermined changeover threshold $\omega_{L1}$, i.e., when the primary angular frequency and the induced voltage are high.

Figure 18:
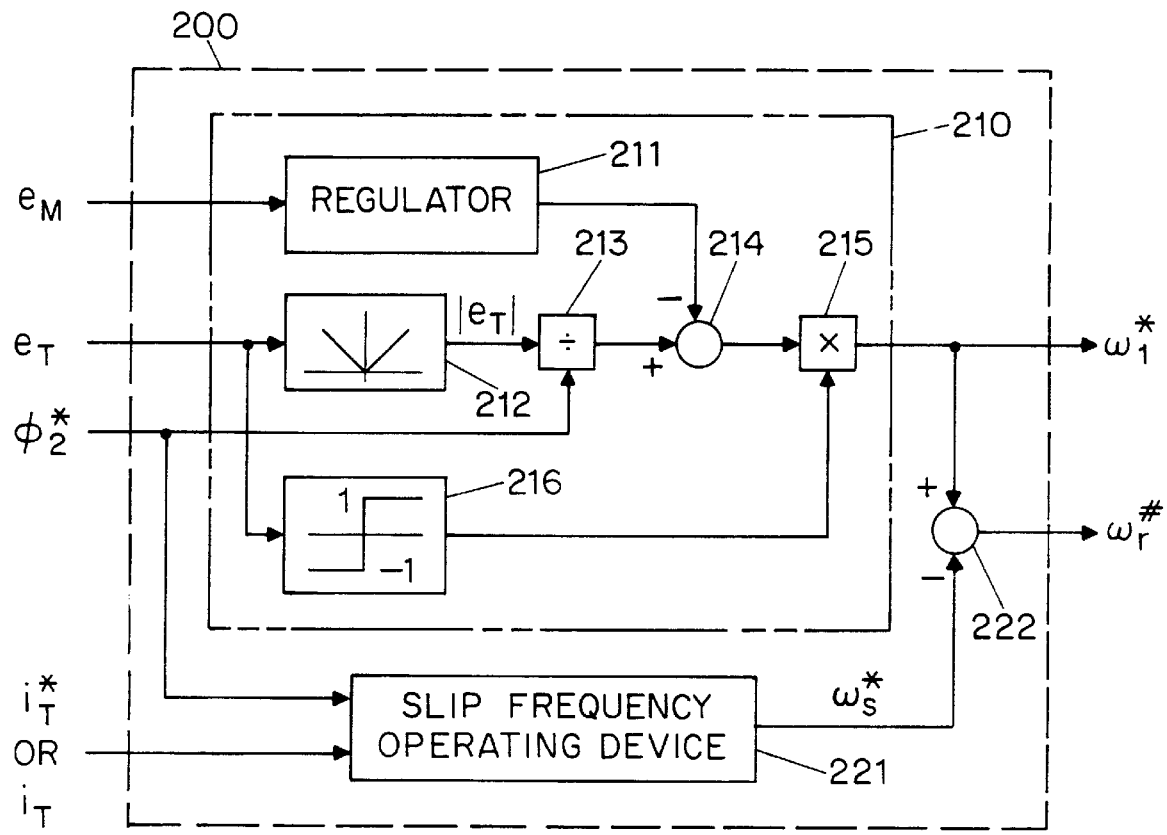
FIG. 18 is a block diagram of the conventional primary angular frequency and speed estimating device.
Figure 19:
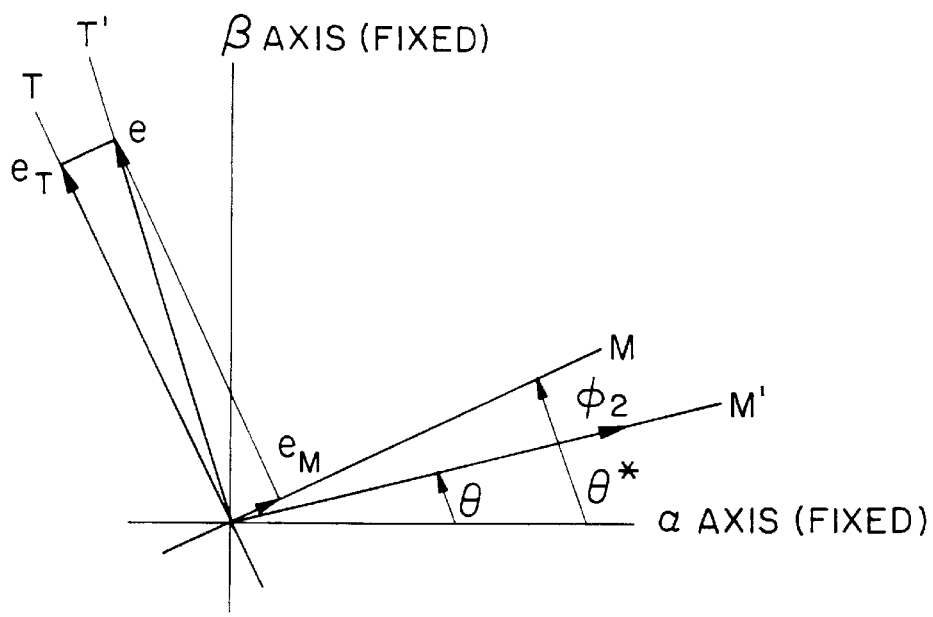
FIG. 19 is a vector diagram of the induced voltage of the induction motor.

The slip frequency generating device 221 generates the reference slip frequency $\omega_s^*$, similarly as in FIG. 18, based on the reference value of secondary magnetic flux $\phi_2^*$ and the reference T-axis current value $i_T^*$ or the actual T-axis current value $i_T$.

The load torque generating device 230 includes a multiplier 231 that multiplies the reference value of secondary magnetic flux $\phi_2^*$ and the reference torque current value $i_T^*$; a differentiator 233 that differentiates the estimated speed $\omega_r\#$; an adder 232 that subtracts the output of the differentiator 233 from the output of the multiplier 231; a low-pass filter 234 to that the output of the adder 232 is inputted; and a sample holder 235 to that the output of the low-pass filter 234 is inputted.

The load torque generating device 230 obtains the generated load torque $T_L\#$ based on the estimated speed $\omega_r\#$ and the output of the low-pass filter 234.

The speed generating device 240 includes an adder 241 that subtracts the generated load torque $T_L\#$ from the output of the multiplier 231, and an integrator 242 to that the output of the adder 241 is inputted. The output of the integrator 242 is inputted as the second generated speed $\omega_{rm}\#$ to the foregoing adder 223.

The adder 241 calculates the acceleration & deceleration torque $T_{acc}$ of the induction motor IM by subtracting the generated load torque $T_L{-}^o$ from the output of the multiplier 231.

Figure 3:
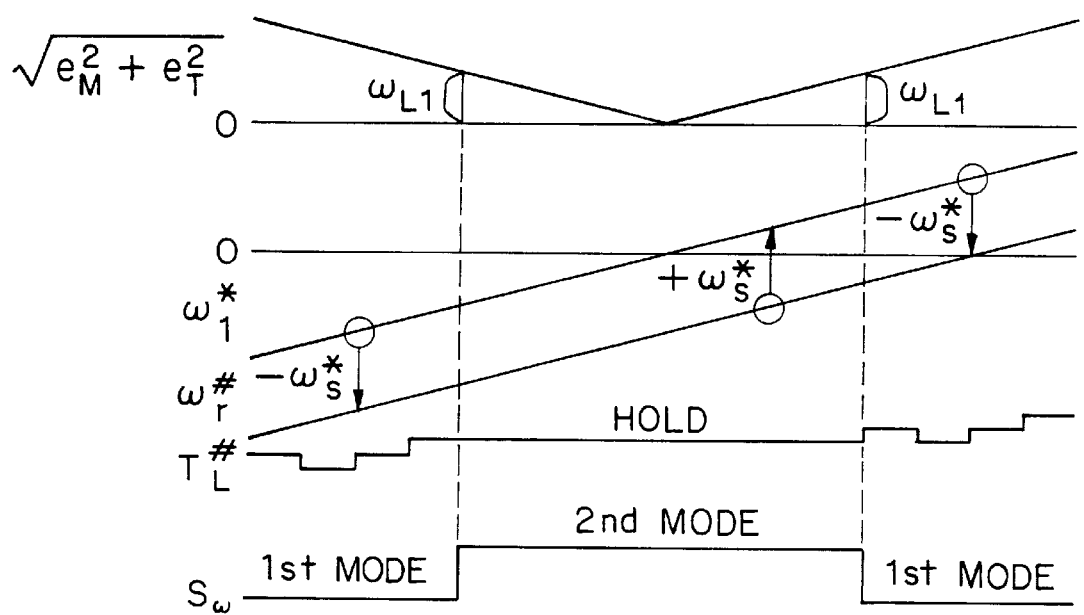
FIG. 3 is a timing chart describing the operation of the estimating device of FIG. 2.

FIG. 3 is a timing chart describing the operation of the estimating device of FIG. 2. In FIG. 3, the changeover switch 224 selects the first generated primary angular frequency $\omega_{f1}\#$, outputted from the primary angular frequency generating device 210, as the reference primary angular frequency $\omega_r^*$ when the changeover signal indicates the first mode of operation.

In this case, the reference primary angular frequency $\omega_l^*$ is expressed by equation (8) similar to equation (1). And, the estimated speed $\omega_r\#$ is expressed by equation (9) same with equation (2).

$$\omega_l^* = sgn(e_T)[(|eT|/\phi_2^*) - G_{em}e_M] \quad (8)$$

$$\omega_r\# = \omega_l^* - \omega_s^* \quad (9)$$

The reference slip frequency $\omega_s^*$ is obtained in the slip frequency generating device 221 by equation (10) same as equation (3). In equation (10), $R_2$ is the secondary resistance of the induction motor IM.

$$\omega_s^* = (R_2\_/\phi_2^*)i_T^* \text{ or } \omega_s^* = (R_2^*/\phi_2^*) \, i_T \quad (10)$$

In the first mode of operation, the sample holder 235 is deactivated, and the load torque generating device 230 obtains the generated load torque $T_L\#$ by equation (11). In equation (11), p is a differential generator, $T_F$ a time constant of the low-pass filter and $T_M$ a mechanical time constant of the induction motor IM corresponding to the moment of inertia.

$$T_L = [1/(1+pT_F)](i_T^*\omega_2^* - PT_M\omega_r\#) \quad (11)$$

The changeover switch 224 selects the second generated primary angular frequency $(\omega_s^* + \omega_{rm}\#)$ as the reference primary angular frequency $\omega_l^*$ when the changeover signal indicates the second mode of operation. In the second mode of operation, the sample holder 235 is enabled, and the generated load torque $T_L\#$ is held at the value at the instance of the changeover from the first mode of operation to the second mode of operation.

At the instance of this changeover, the speed generating device 240 starts generating the second generated speed $\omega_{rm}\#$. The second generated speed $\omega_{rm}\#$ is estimated by equation (12):

$$\omega_{rm}\# = (1/T_M)\int(i_T^*\phi_2^* - T_L\#)dt \quad (12)$$

In this case, $\omega_l^*$ is obtained by equation (13) in the second adder 223:

$$\omega_l^* = \omega_{rm}\# + \omega_s^* \quad (13)$$

The estimated speed $\omega_r\#$ is obtained in the first and second adders 222 and 223 by equation (14). The estimated speed $\omega_r\#$ as shown by equation (14) coincides with the second generated speed $\omega_{rm}\#$ expressed by the foregoing equation (12).

$$\omega_r\# = \omega_{rm}\# + \omega_s^* - \omega_s^* = \omega_{rm}\# \quad (14)$$

Figure 4:
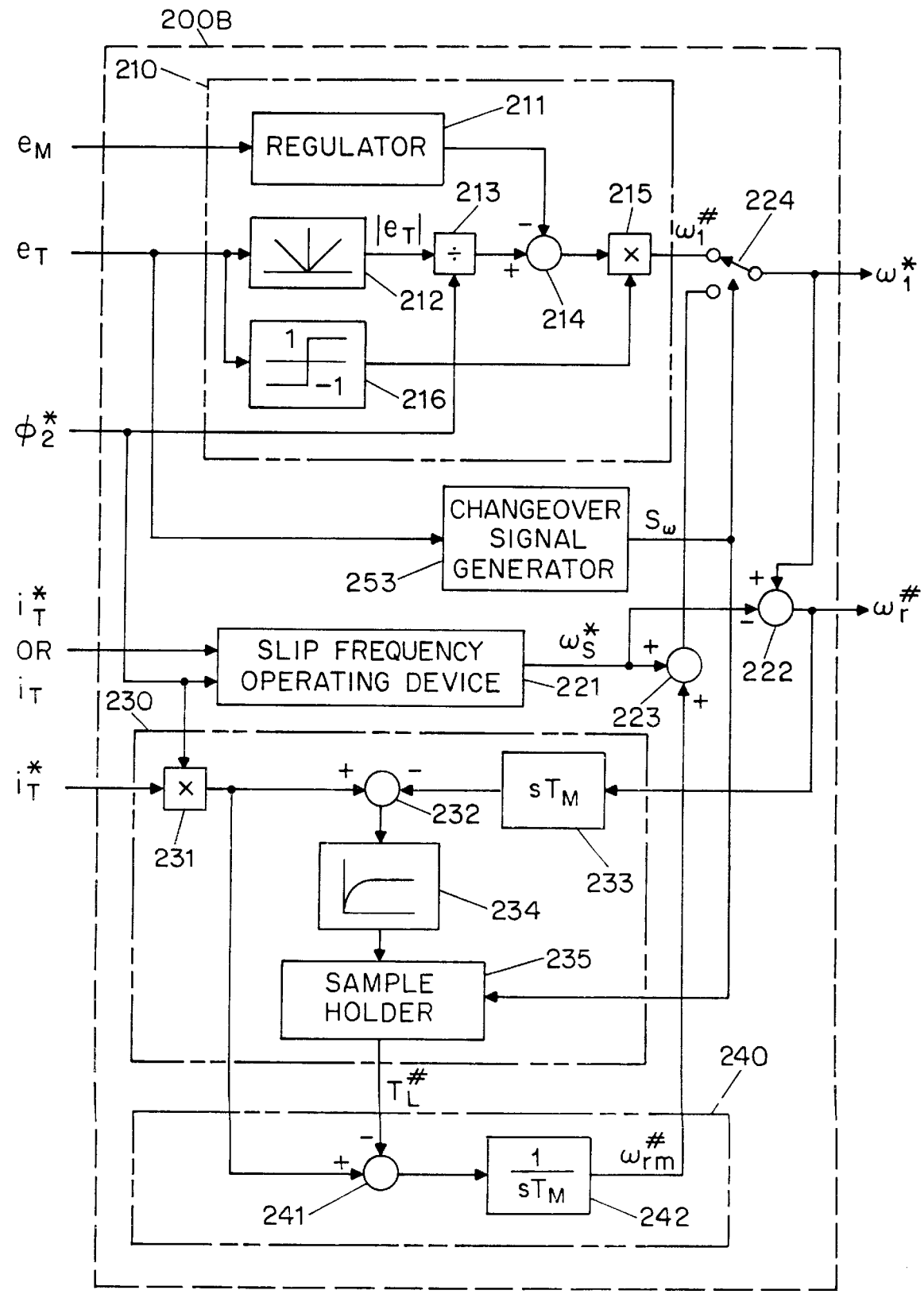
FIG. 4 is a block diagram of a second embodiment of an estimating device of the variable speed controller according to the present invention.

FIG. 4 is a block diagram of a second embodiment of a primary angular frequency and speed estimating device 200B. The second embodiment has a similar structure with that of the first embodiment except that a changeover signal generator 253 generates the changeover signal $S_\omega$ based on the induced T-axis voltage $e_T$.

Figure 5:
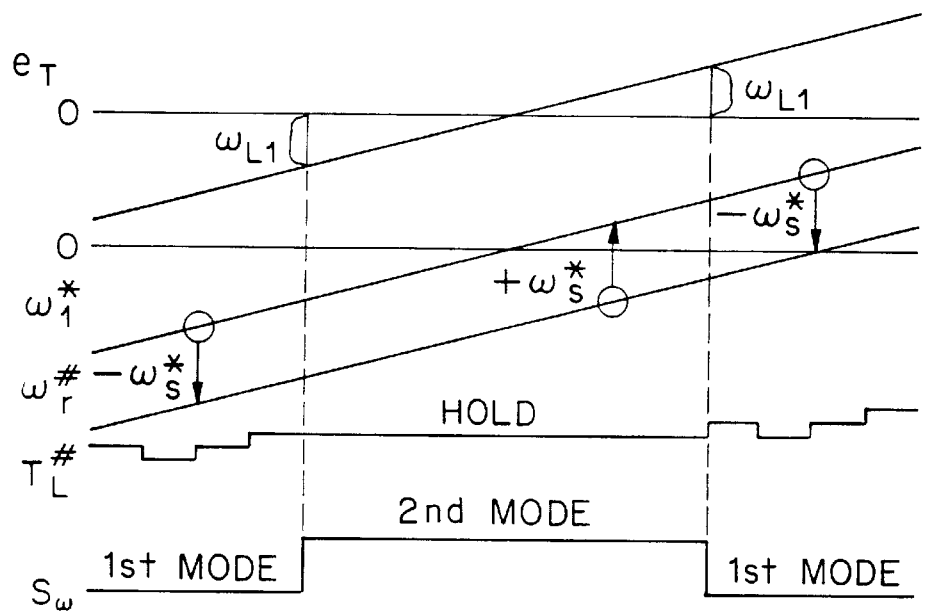
FIG. 5 is a timing chart describing the operation of the estimating device of FIG. 4.

FIG. 5 is a timing chart describing the operation of the second embodiment of the estimating device of the present invention as shown in FIG. 4. As shown in FIG. 5, the magnitude of the primary angular frequency, i.e., the magnitude of the induced voltage, is judged on the basis of the induced T-axis voltage $e_T$. The changeover signal generator 253 generates the changeover signal $S_\omega$ indicating the second mode of operation when the absolute value of the induced T-axis voltage $e_T$ is equal to or less than the changeover threshold $\omega_{L1}$, i.e., when the primary angular frequency and the induced voltage are low. The changeover signal $S_\omega$ indicates the first mode of operation when the absolute value of the induced T-axis voltage $e_T$ is greater than the predetermined changeover threshold $\omega_{L1}$, i.e., when the primary angular frequency and the induced voltage are high. The other operations are the same as those of the first embodiment.

Figure 6:
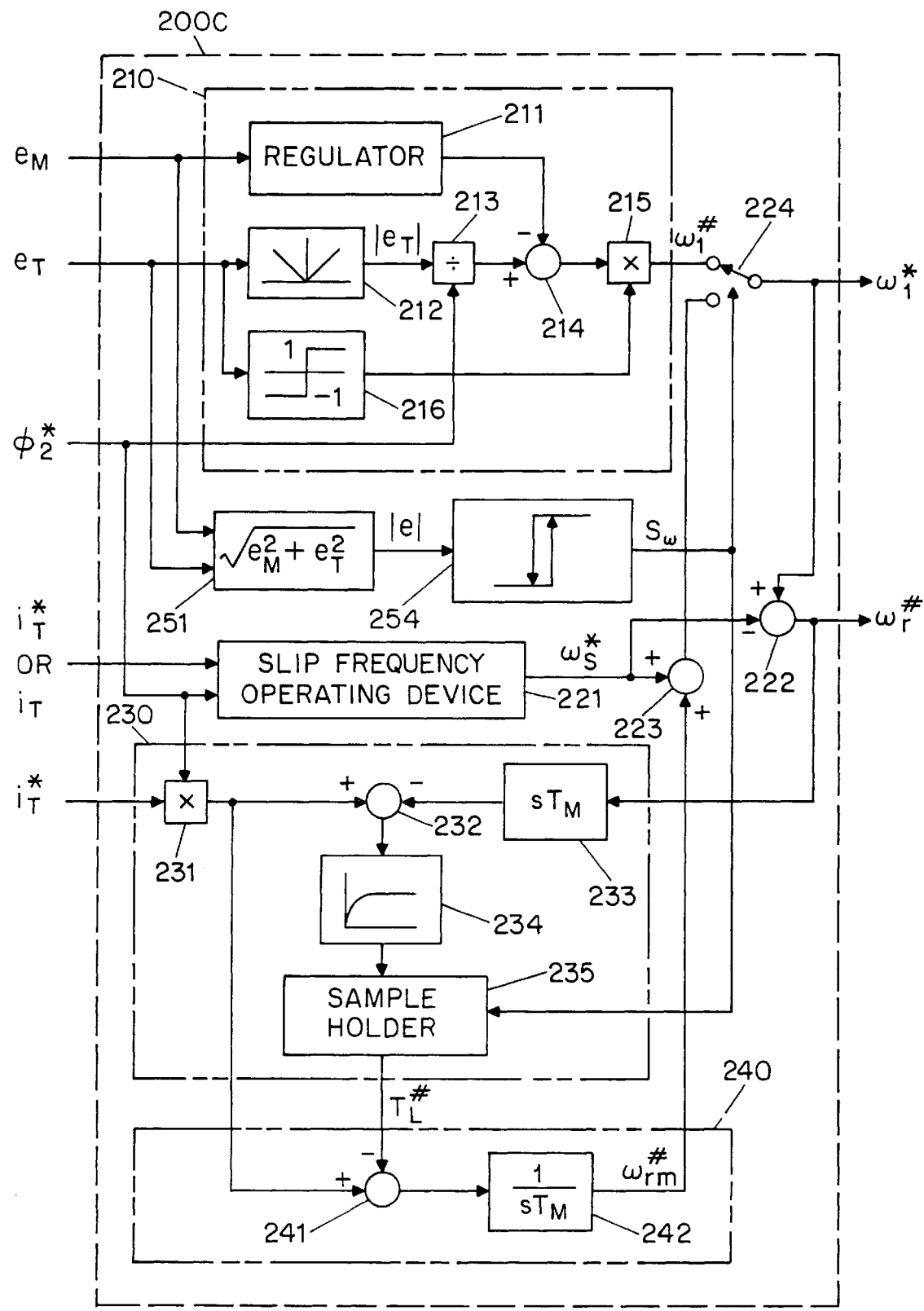
FIG. 6 is a block diagram of a third embodiment of an estimating device of the variable speed controller according to the present invention.

FIG. 6 is a block diagram of a third embodiment of an estimating device 200C. The third embodiment has a similar structure with that of the first embodiment except that a changeover signal generator 254 generates the changeover signal $S_\omega$ by comparing the absolute value of the induced voltage $|e|$ with two changeover thresholds $\omega_{L1}$ and $\omega_{L2}$.

Figure 7:
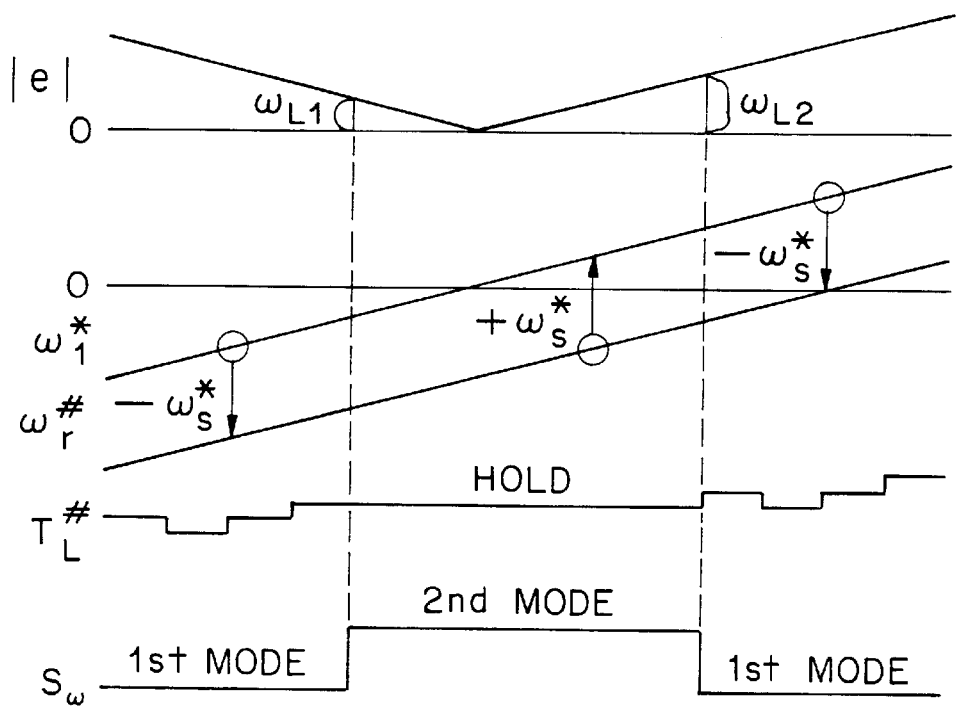
FIG. 7 is a timing chart describing the operation of the estimating device of FIG. 6.

FIG. 7 is a timing chart describing the operation of the third embodiment of the estimating device of the present invention as shown in FIG. 6. In FIG. 7, the changeover threshold in the changeover signal generator 254 is set at $\omega_{L1}$ for the changeover from the first mode of operation to the second mode of operation, and the changeover threshold is set at $\omega_{L2}$ for the changeover from the second mode of operation to the first mode of operation. Note, in FIG. 7 $\omega_{L1}$ is less than $\omega_{L2}$.

By maintaining the second mode of operation until the induced voltage becomes high enough to exceed the threshold $\omega_{L2}$ and by outputting the second generated speed $\omega_{rm}\#$ of equation (12) as the estimated speed $\omega_r\#$, the speed controllability is improved in the drive region where the induced voltage is small.

Figure 8:
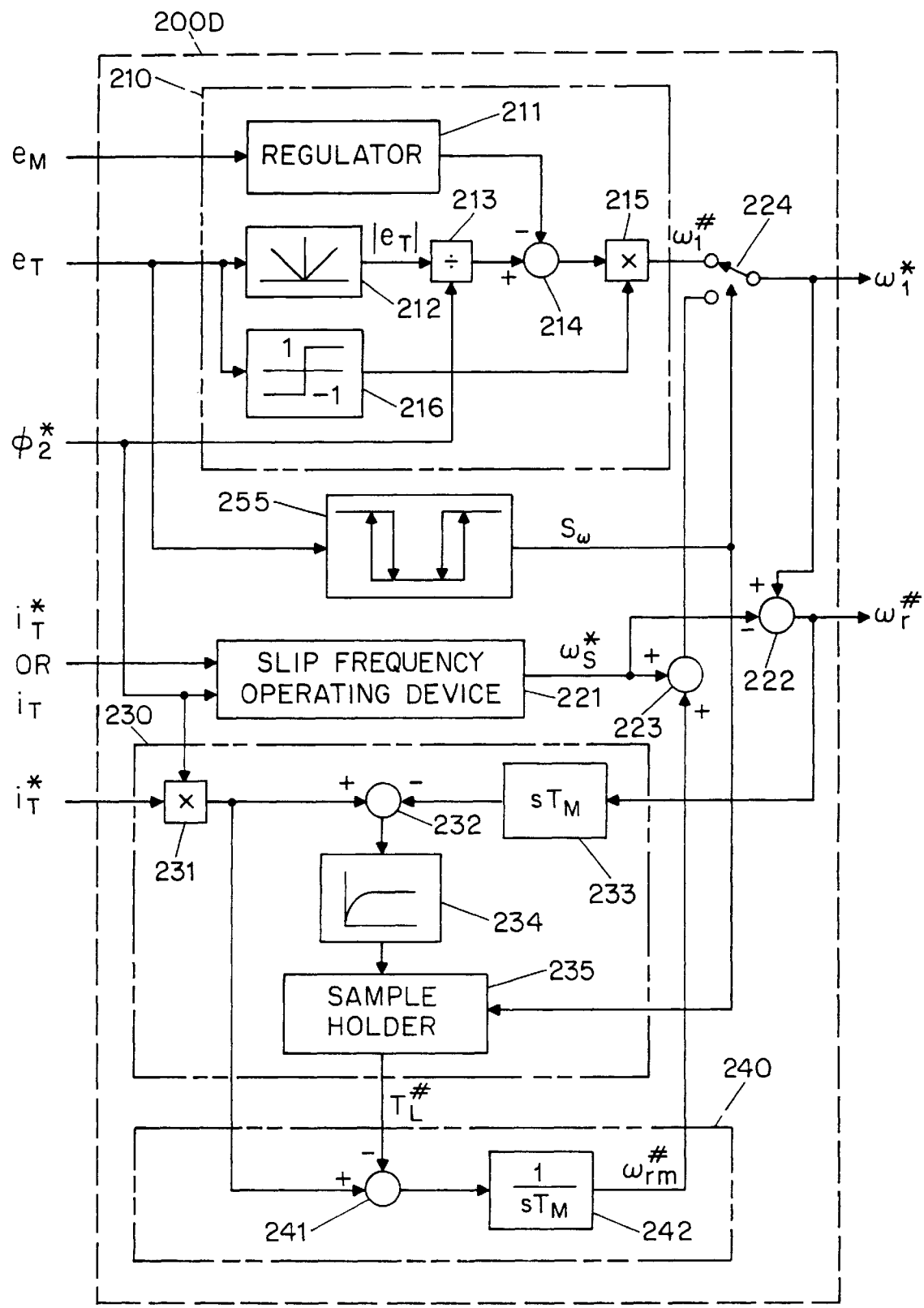
FIG. 8 is a block diagram of a fourth embodiment of an estimating device of the variable speed controller according to the present invention.

FIG. 8 is a block diagram of a fourth embodiment of an estimating device 200D. The fourth embodiment has a similar structure with that of the first embodiment except that a changeover signal generator 255, to that the induced T-axis voltage value $e_T$ is inputted, works as the so-called window comparator to generate the changeover signal $S_\omega$.

Figure 9:
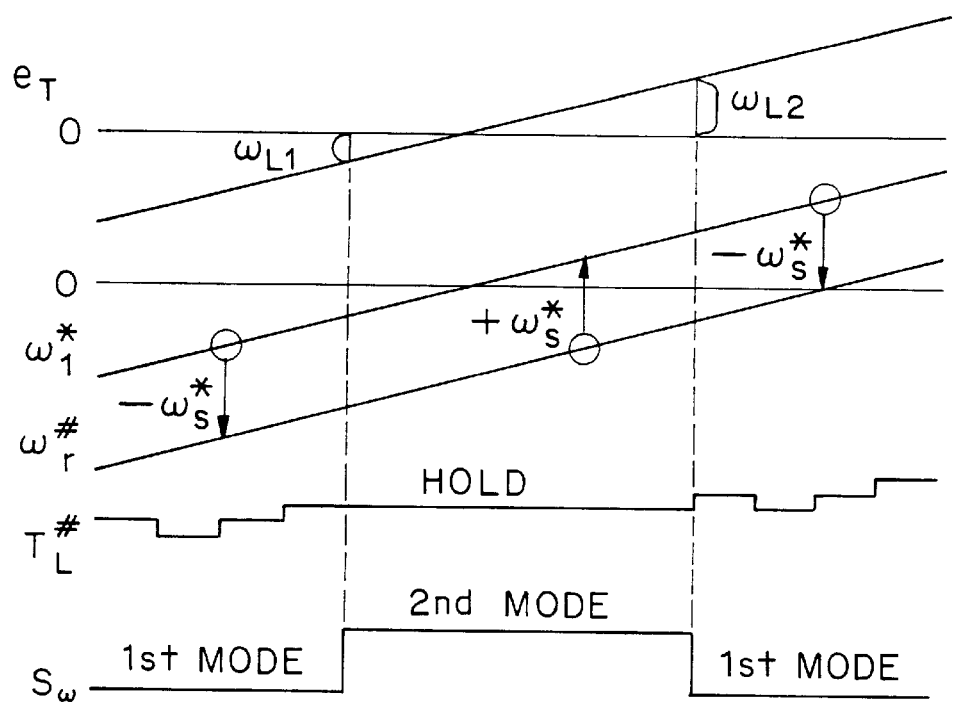
FIG. 9 is a timing chart describing the operation of the estimating device of FIG. 8.

FIG. 9 is a timing chart describing the operation of the fourth embodiment of the estimating device of the present invention as shown in FIG. 8. Two thresholds $\omega_{L1}$ and $\omega_{L2}$ of the changeover signal generator 255 are set such that $|\omega_{L1}| < |\omega_{L2}|$. The operation of the fourth embodiment as shown in FIG. 9 is identical to that of the second embodiment except that the second embodiment has different thresholds depending on the changeover from the first mode of operation to the second mode of operation versus the changeover from the second mode of operation to the first mode of operation.

Figure 10:
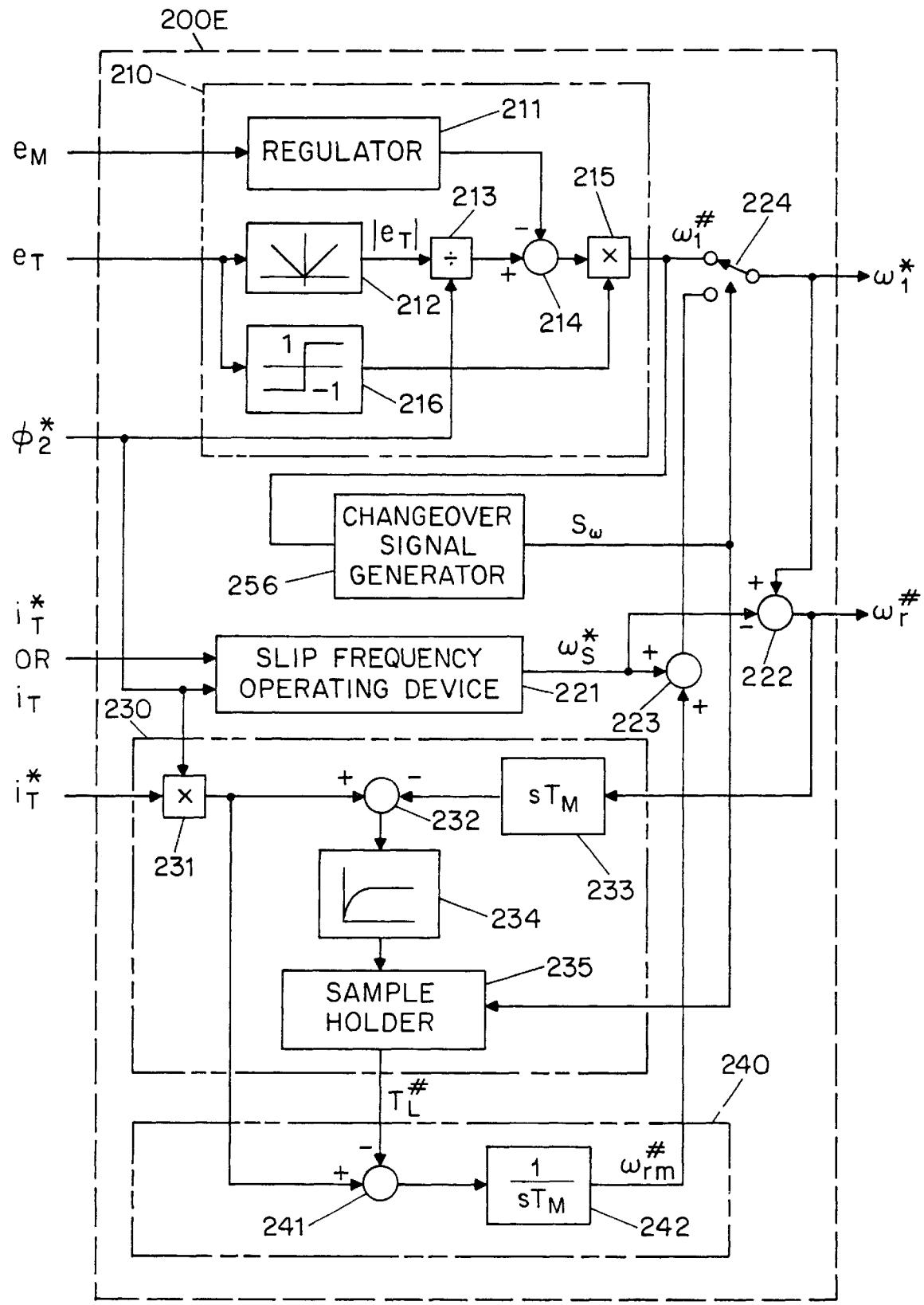
FIG. 10 is a block diagram of a fifth embodiment of an estimating device of the variable speed controller according to the present invention.

FIG. 10 is a block diagram of a fifth embodiment of an estimating device 200E. The fifth embodiment has a similar structure with that of the first embodiment except that a changeover signal generator 256 generates the changeover signal $S_\omega$ based on the first generated primary angular frequency $\omega_f\#$ inputted thereto.

Figure 11:
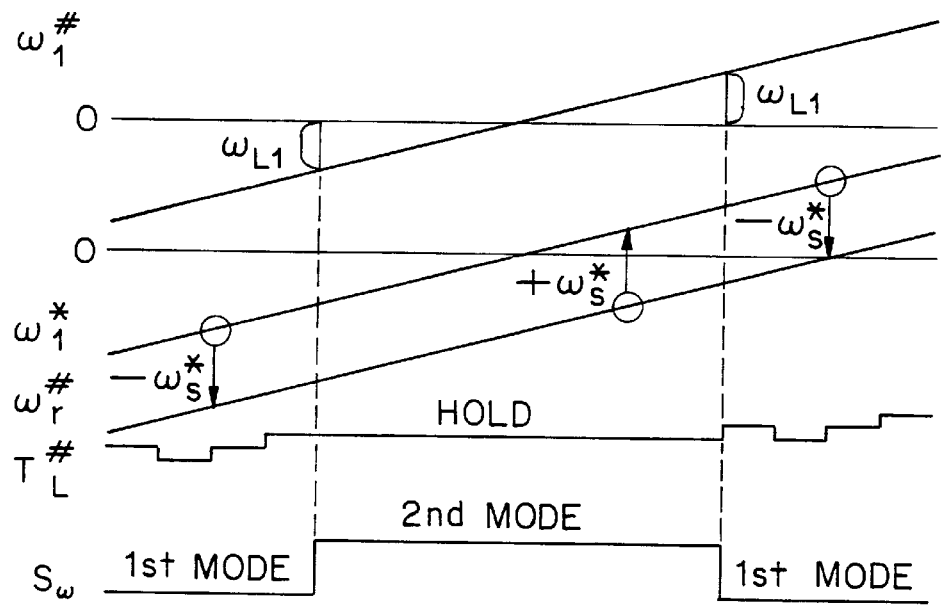
FIG. 11 is a timing chart describing the operation of the estimating device of FIG. 10.

FIG. 11 is a timing chart describing the operation of the fifth embodiment of the estimating device of the present invention as shown in FIG. 10. In FIG. 11, the changeover signal generator 256 generates the changeover signal $S_\omega$ that selects the second mode of operation when the absolute value of the first generated primary angular frequency $\omega_f\#$ is equal to or less than the changeover threshold $\omega_{L1}$, and selects the first mode of operation when the absolute value of $\omega_f\#$ is greater than $\omega_{L1}$. The operation of the fifth embodiment of FIG. 10 is similar to that of the second embodiment of FIG. 4 except that the input to the changeover signal generator 256 in FIG. 10 is the first generated primary angular frequency $\omega_f\#$ instead of the induced T-axis voltage $e_T$ as in FIG. 4.

Figure 12:
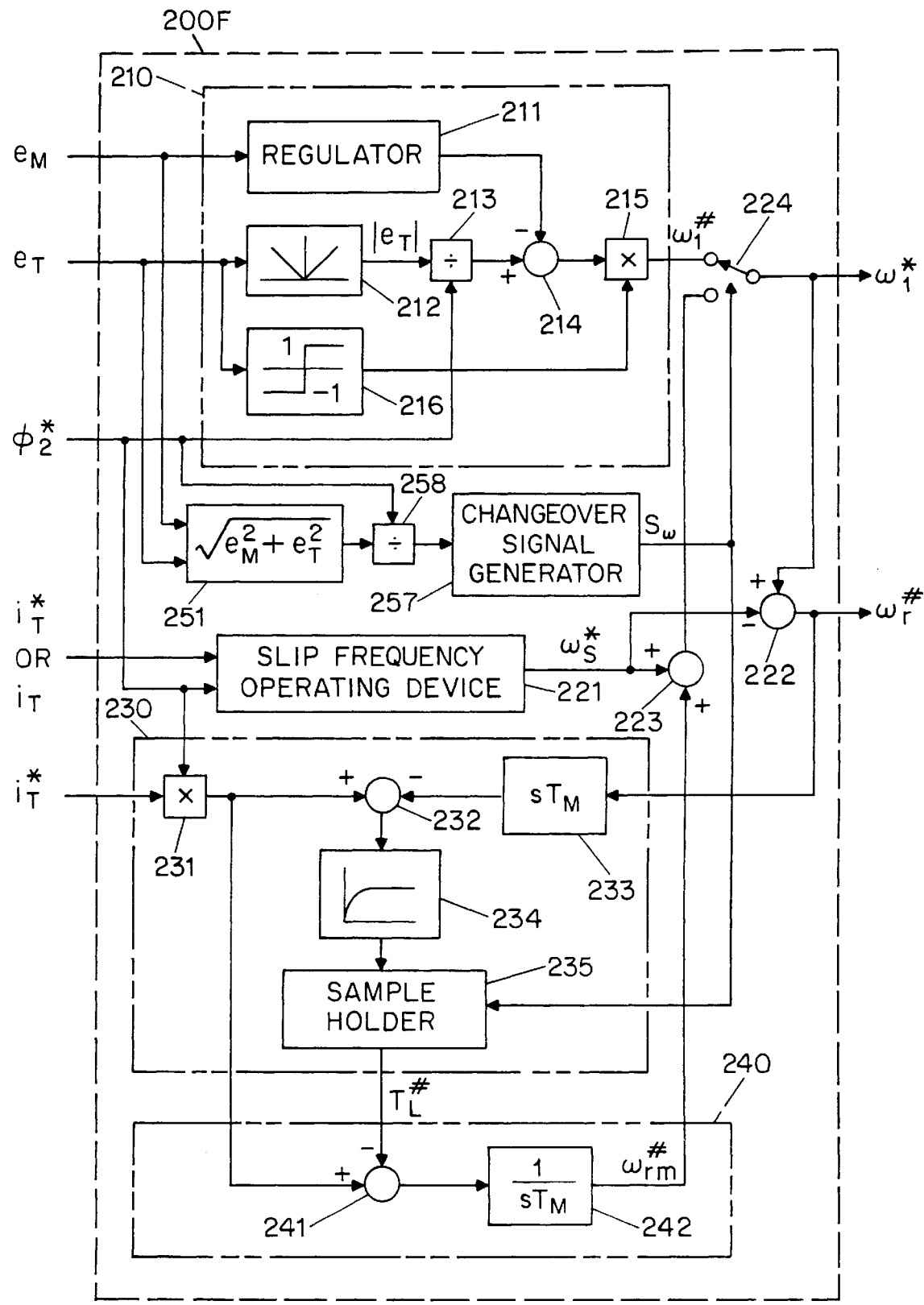
FIG. 12 is a block diagram of a sixth embodiment of an estimating device of the variable speed controller according to the present invention.

FIG. 12 is a block diagram of a sixth embodiment of an estimating device 200F. The sixth embodiment is similar in structure to the first embodiment except that a changeover signal generator 257 generates the changeover signal $S_\omega$ in response to the input $\sqrt{(e_M^2+e_T^2)}/\phi_2^*$. Here, $\sqrt{(e_M^2+e_T^2)}$ is the output of the induced voltage generating device 251 and $\phi_2^*$ is the reference value of the secondary magnetic flux.

Figure 13:
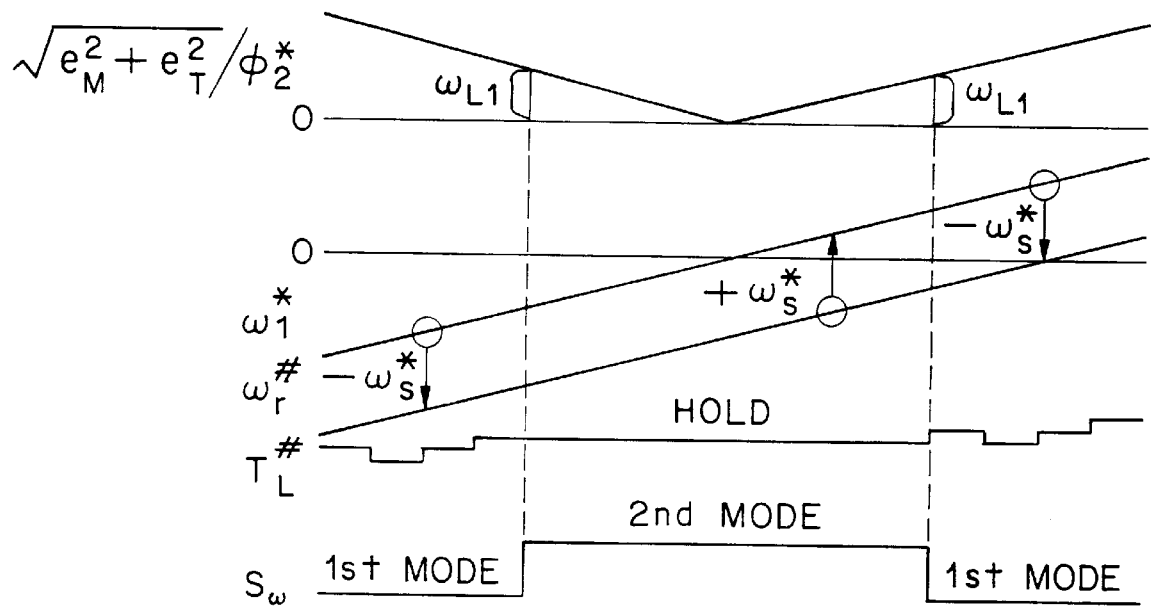
FIG. 13 is a timing chart describing the operation of the estimating device of FIG. 12.

FIG. 13 is a timing chart describing the operation of the sixth embodiment of the estimating device of the present invention as shown FIG. 12. In FIG. 13, the changeover signal generator 257 generates the changeover signal $S_\omega$ that selects the second mode of operation when the input $\sqrt{(e_M^2+e_T^2)}/\phi_2^*$ is equal to or less than the changeover threshold $\omega_{L1}$, and selects the first mode of operation when $\sqrt{(e_M^2+e_T^2)}/\phi_2^*$ is greater than the changeover threshold $\omega_{L1}$.

Figure 14:
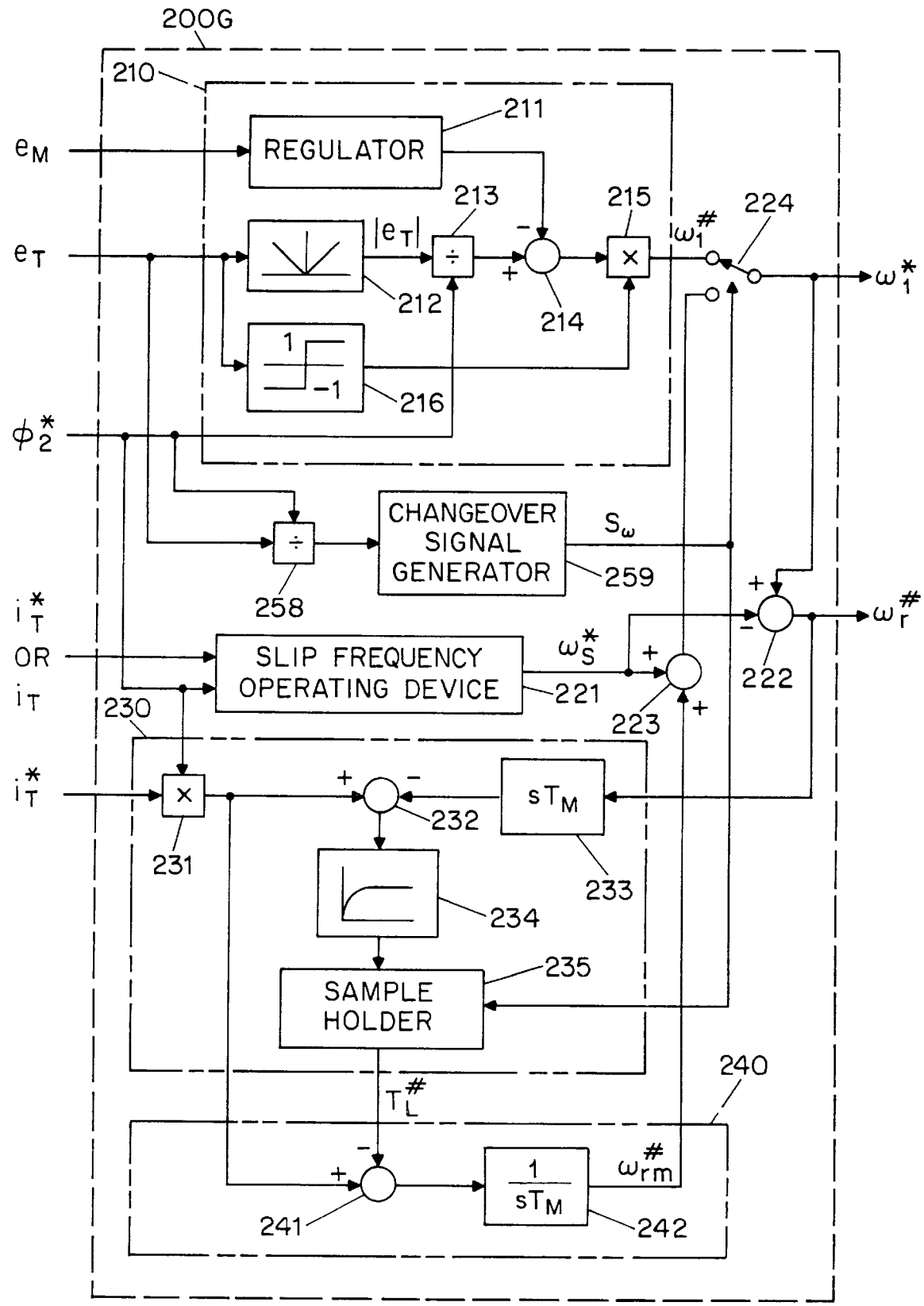
FIG. 14 is a block diagram of a seventh embodiment of an estimating device of the variable speed controller according to the present invention.

FIG. 14 is a block diagram of a seventh embodiment of an estimating device 200G. In the seventh embodiment, a changeover signal generator 259 generates the changeover signal $S_\omega$ in response to the input $(e_T/\phi_2^*)$ obtained by divider 258 by dividing the induced T-axis voltage value $e_T$ by the reference value of the secondary magnetic flux $\phi_2^*$.

Figure 15:
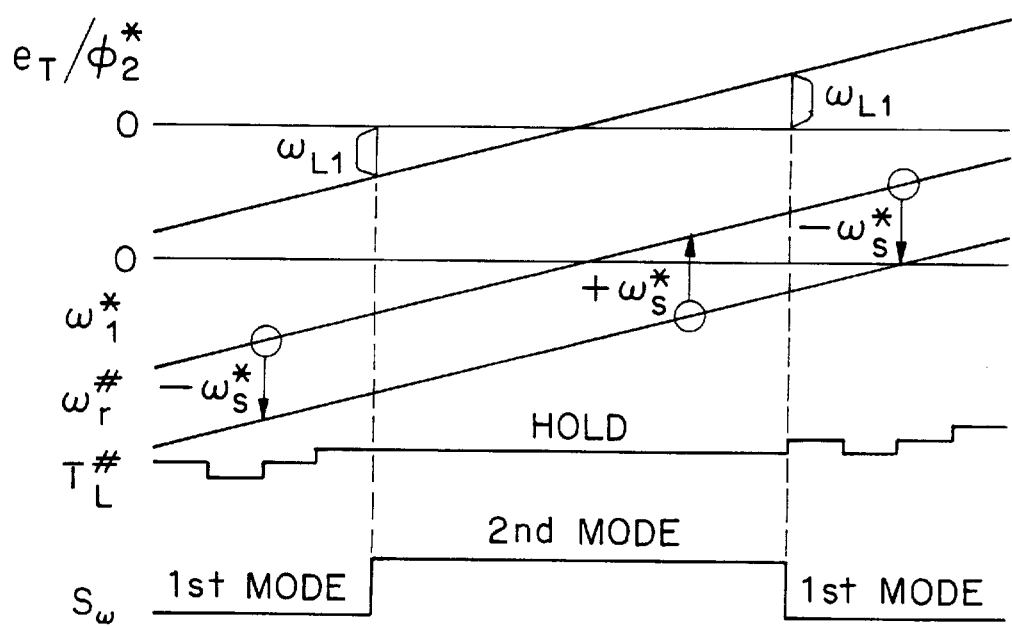
FIG. 15 is a timing chart describing the operation of the estimating device of FIG. 14.
Figure 16:
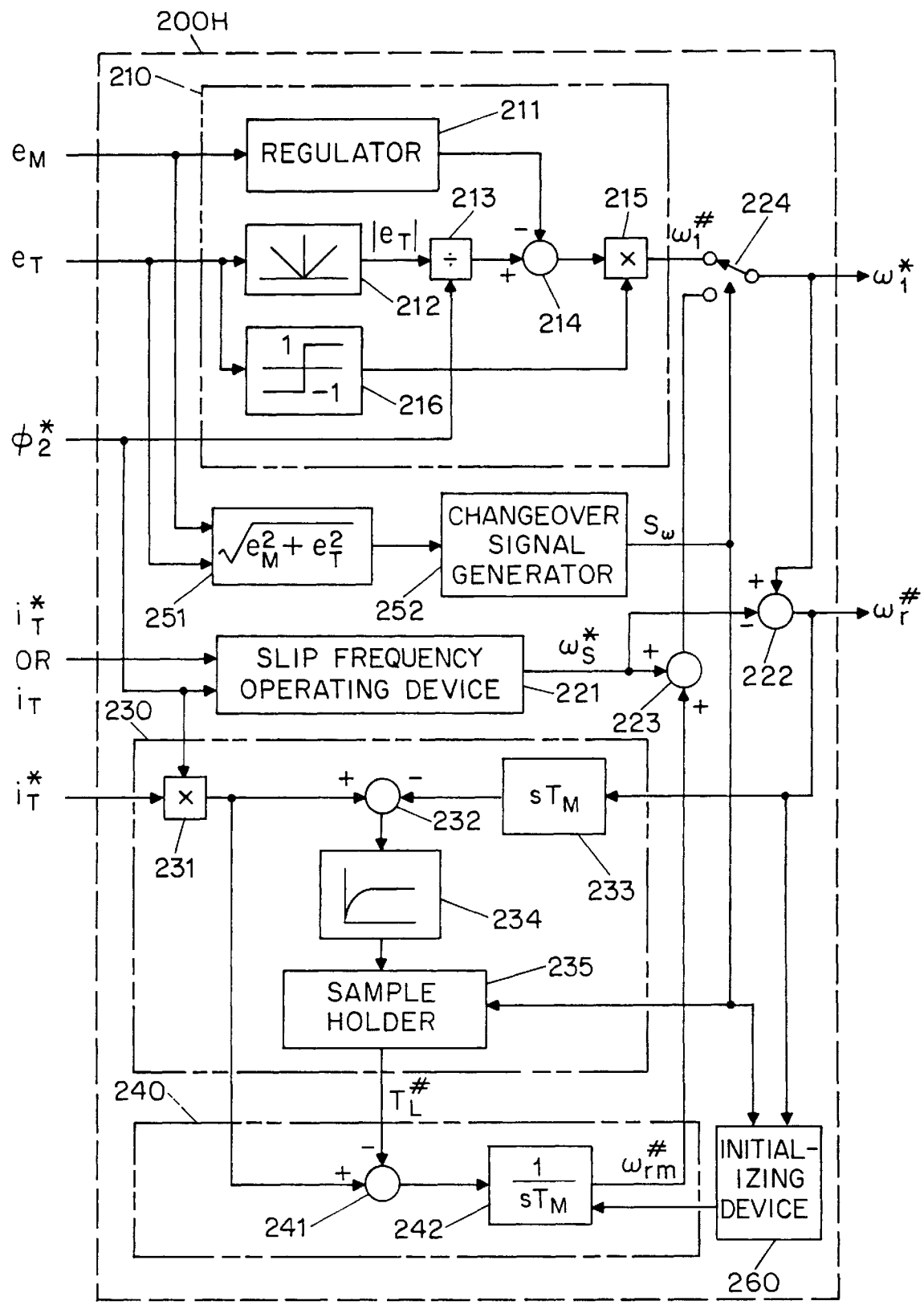
FIG. 16 is a block diagram of an eighth embodiment of an estimating device of the variable speed controller according to the present invention.

FIG. 15 is a timing chart describing the operation of the seventh embodiment of the estimating device of the present invention as shown in FIG. 14. In FIG. 15, the changeover signal generator 259 generates the changeover signal $S_\omega$ that selects the second mode of operation when the input $(e_T/\phi_2^*)$ is equal to or less than the changeover threshold $\omega_{L1}$, and selects the first mode of operation when $(e_T/\phi_2^*)$ is greater than $\omega_{L1}$. The operation of the seventh embodiment is similar to the operation of the second and fifth embodiments except the operation of the changeover signal generator FIG. 16 is a block diagram of an eighth embodiment of an estimating device of the variable speed controller according to the present invention. In the estimating device 200H of the eighth embodiment, an initializing device 260 is added to the structure of the estimating device of the first embodiment. The changeover signal $S_\omega$ and the estimated speed $\omega_r\#$ are inputted to the initializing device 260. The output of the initializing device 260 is inputted to the integrator 242. The operation of the eighth embodiment is essentially same with that of the first embodiment except that the value of the integrator 242 is initialized with the estimated speed $\omega_r\#$ at the instance when the first mode of operation is changed over to the second mode of operation by the changeover signal $S_\omega$. The eighth embodiment may be combined with all the other embodiments.

As explained above, the induction motor is controlled by generating its speed in a load torque generating device or a mechanical model generating device using the reference or actual T-axis current value in the drive region where the primary angular frequency is small, i.e., in the region where the low detected voltage causes relatively large computational error of the induced voltage. Therefore, the variable speed controller according to the invention facilitates excellent control of the induction motor especially in the drive region where the induced voltage is low.

While the operation of the invention has been described in connection with an exemplary analogue embodiment, it will be apparent to those skilled in the art that a digital implementation using a microprocessor and control program is also possible.

Moreover, the variable speed controller of the invention is very economical, since the conventional primary angular frequency generating device and slip frequency generating device of the estimating device can be used without any modifications.

We claim:

1. A variable speed controller for an induction motor, said variable speed controller resolving a primary current of said induction motor into a magnetizing current and a torque current, said primary current provided by an electric power converter generating outputs at variable voltages, frequencies and phases, said magnetizing current being a component providing a magnetic field parallel to a magnetic flux axis of said induction motor, said torque current being a component in quadrature phase to said magnetizing current, and said variable speed controller regulating said magnetizing current and said torque current independently to control an induction motor torque, said variable speed controller comprising:

(a) a magnetic flux phase device for integrating a reference primary angular frequency signal and for obtaining a signal representing the position of said magnetic flux axis;

(b) an induced voltage generating device for generating a signal representing the induced voltage of said induction motor;

(c) a first primary angular frequency generating device for generating a first primary angular frequency signal based on said induced voltage and a magnetic flux value;

(d) a slip frequency generating device for generating a signal representing a reference slip frequency based on a reference torque current value, or an actual torque current value, and a reference magnetic flux value;

(e) a first speed generating device for subtracting said signal representing said reference slip frequency from said signal representing said first primary angular frequency, and for obtaining a signal representing a first speed value;

(f) a changeover signal generator responsive to a signal representing a sensed operating condition of said motor for generating a changeover signal, said changeover signal representing a first mode of operation and a second mode of operation for said variable speed controller, said first and second modes of operation determined by a predetermined changeover threshold of said sensed operating condition signal;

(g) a load torque generating device for generating a signal representing an estimated load torque based on said reference torque current value, said signal representing said first speed value, and said magnetic flux value;

(h) a sample holder for holding said signal representing said estimated load torque in said second mode of operation;

(i) an acceleration and deceleration torque generating device for subtracting said signal representing said estimated load torque from the product of said reference torque current value and said magnetic flux value, said acceleration and deceleration torque device generating a signal representing an acceleration and deceleration torque value;

(j) an integrator for integrating said signal representing said acceleration and deceleration torque value with an induction motor mechanical constant to obtain a signal representing a second speed value;

(k) an adder for adding said signal representing said second speed value and said signal representing said reference slip frequency, to obtain a signal representing a second primary angular frequency; and (l) an output device for selecting and outputting, in response to said changeover signal indicating said first mode of operation, said signal representing said first primary angular frequency as said reference primary angular frequency, and said signal representing said first speed value as an estimated speed, and for selecting and outputting, in response to said changeover signal indicating said second mode of operation, said signal representing said second primary angular frequency as said reference primary angular frequency and said signal representing said second speed value as said estimated speed.

2. The variable speed controller according to claim 1, wherein said changeover signal generator is responsive to said signal representing said induced voltage of said induction motor being greater than said predetermined changeover threshold to indicate said first mode of operation, said signal representing said induced voltage of said induction motor being less than or equal to said predetermined changeover threshold to indicate said second mode of operation.

3. The variable speed controller according to claim 1, wherein said predetermined changeover threshold for changing over from said first mode of operation to said second mode of operation is less than the predetermined changeover threshold for changing over from said second mode of operation to said first mode of operation.

4. The variable speed controller according to claim 1, wherein said changeover signal generator is responsive to said signal representing said first generated primary angular frequency being greater than said predetermined changeover threshold to indicate said first mode of operation, and responsive to said signal representing said first generated primary angular frequency being less than or equal to said predetermined changeover threshold to indicate said second mode of operation.

5. The variable speed controller according to claim 1, wherein said changeover signal generator is responsive to said signal representing said induced voltage of said induction motor divided by said magnetic flux value being greater than said predetermined changeover threshold to indicate said first mode of operation, and responsive said signal representing said induced voltage of said induction motor divided by said magnetic flux value being less than or equal to said predetermined changeover threshold to indicate said second mode of operation.

6. The variable speed controller according to claim 1, wherein said integrator for integrating said signal representing said acceleration and deceleration torque value has an initial value equal to said signal representing said first speed value at the instance of the changeover from said first mode of operation to said second mode of operation.

* * * * *

UNITED STATES PATENT AND TRADEMARK OFFICE
CERTIFICATE OF CORRECTION

PATENT NO. : 5,828,199
DATED : October 27, 1998
INVENTOR(S) : Tajima et al

It is certified that error appears in the above-identified patent and that said Letters Patent is hereby corrected as shown below:

Column 6, line 55, "$S\omega$" should read -- $S_\omega$ --;

Column 7, line 24, "$\omega_r^*$" should read -- $\omega_l^*$ --;

Column 7, line 47, "$T_L=[1/(1+pT_F)](i_T^*\omega_2^* - PT_M\omega_r^\#)$"

should read -- $T_L''=[1/(1+pT_F)](i_T^*\omega_2^* - pT_M\omega_r'')$ --.

Signed and Sealed this

Fifth Day of September, 2000

Attest:

Q. TODD DICKINSON

*Attesting Officer*  *Director of Patents and Trademarks*